United States Patent [19]

Lewis

[11] Patent Number: 5,365,234
[45] Date of Patent: Nov. 15, 1994

[54] HIGH-RESOLUTION SIDELOBE-CANCELLER AUXILIARY ANTENNAS

[75] Inventor: Bernard L. Lewis, Oxon Hill, Md.

[73] Assignee: United States of America as represented by the Secretary of the Navy

[21] Appl. No.: 783,918

[22] Filed: Mar. 23, 1977

[51] Int. Cl.⁵ .............................................. G01S 7/36
[52] U.S. Cl. .................................... 342/16; 342/379
[58] Field of Search ................. 343/100 LE, 100 SA, 343/754, 119; 342/16, 379, 380, 381, 382, 383, 384, 17, 19, 39

[56] References Cited

U.S. PATENT DOCUMENTS

| | | | |
|---|---|---|---|
| 3,177,489 | 4/1965 | Saltzberg | 343/100 LE |
| 3,202,990 | 8/1965 | Howells | 343/100 LE |
| 3,560,985 | 2/1971 | Lyon | 343/100 SA X |
| 3,922,681 | 11/1975 | Lewis | 343/754 |
| 4,097,866 | 6/1978 | Frost et al. | 342/380 |
| 4,204,211 | 5/1980 | Cavelos | 342/380 |
| 4,359,738 | 11/1982 | Lewis | 342/379 |
| 4,439,769 | 3/1984 | Masak | 342/380 |
| 4,439,770 | 3/1984 | Lewis et al. | 342/381 |
| 4,586,048 | 4/1986 | Downie | 342/379 |
| 4,689,628 | 8/1987 | Lewis | 342/384 |
| 5,049,890 | 9/1991 | Hansen | 342/384 |
| 5,162,805 | 11/1992 | Cantrell | 342/379 |
| 5,291,209 | 3/1994 | Evans et al. | 342/381 |
| 5,296,865 | 3/1994 | Lewis | 342/384 |

*Primary Examiner*—John B. Sotomayor
*Attorney, Agent, or Firm*—Thomas E. McDonnell

[57] ABSTRACT

A sidelobe canceller system utilizing directional auxiliary antennas and time delays allows the spacing between the auxiliary antennas and a main radar antenna to be increased. This improves cancellation of multiple interference signals from the sidelobes of the main antenna.

9 Claims, 3 Drawing Sheets

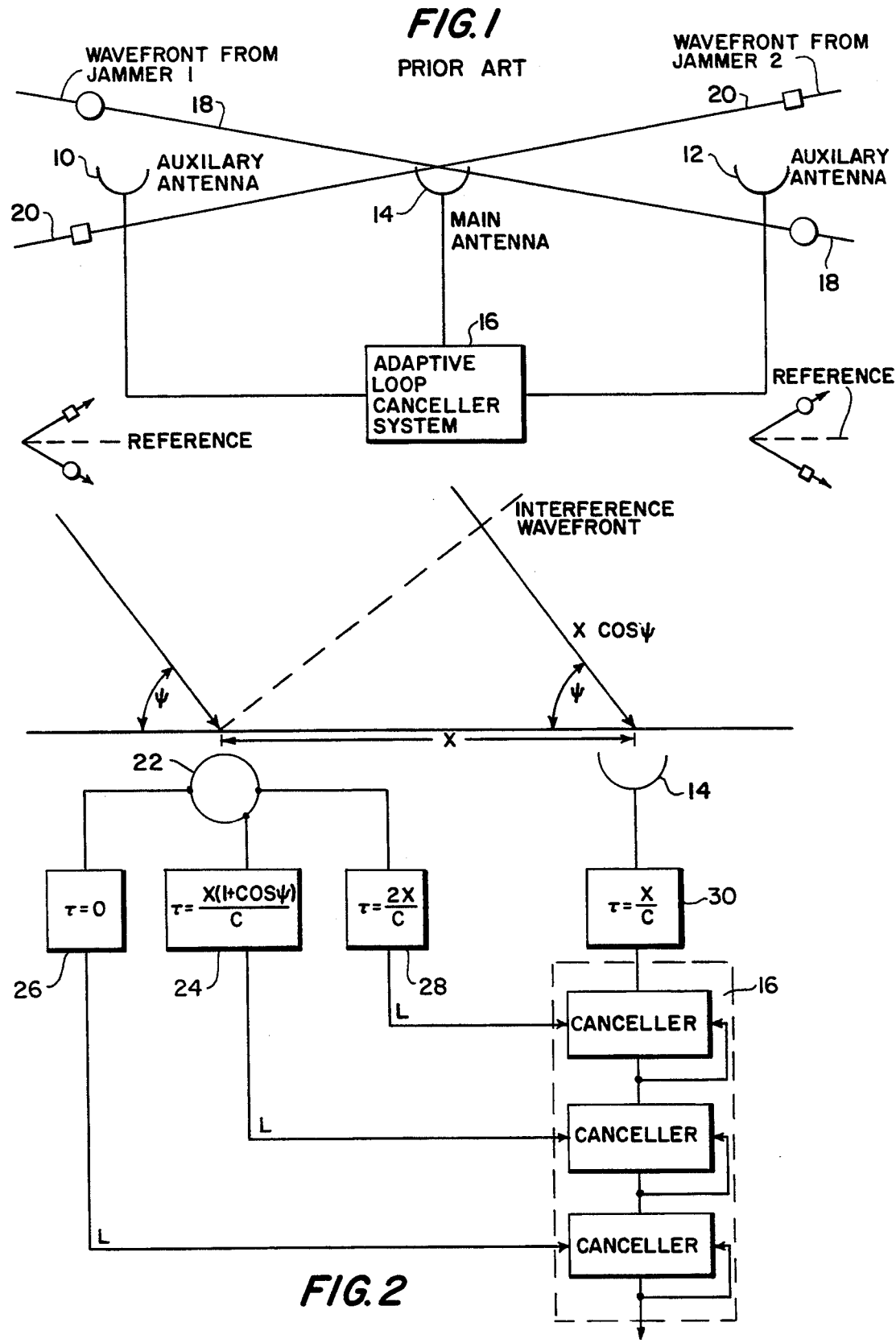

HIGH-RESOLUTION SIDELOBE-CANCELLER AUXILIARY ANTENNAS

BACKGROUND OF THE INVENTION

1. Field of the Invention

The invention relates to a sidelobe canceller system for cancelling multiple interference signals from the sidelobes of the main antenna of a communications receiver. More particularly, the invention relates to the use of directional auxiliary antennas and time delays to allow the spacing between the auxiliary antennas and the main antenna to be increased.

2. Description of the Prior Art

A communications receiver has a main antenna and may have a sidelobe canceller system for cancelling interference from the sidelobes of the main antenna. Prior art side lobe canceller systems normally contain multiple auxiliary antennas which may be either directional (U.S. Pat. No. 3,177,489) or omnidirectional and are spaced close to the main radar antenna. The spacing is critical because the signals from the main radar antenna and from the auxiliary antenna must be received in the adaptive-loop canceller at the same time for autocorrelation and cancelling to take place. The spacing is dependent on the radar pulse-width and is of the order of 1/100 of the distance light will travel in the time-equivalent of the pulse-length, normally several meters (i.e., 3 meters for a 1 $\mu$sec. pulsewidth). Such systems have trouble cancelling multiple interference signals which have only a small difference in angle of arrival. It would be desirable to have a system in which the main and auxiliary antennas could be widely spaced (e.g., 150 meters) to obtain good angular resolution of interference signals but still have the main and auxiliary antenna signals received simultaneously at the adaptive loop canceller system so that autocorrelation and cancelling would take place.

SUMMARY

The present invention provides such a sidelobe canceller system for cancelling interference from the sidelobes of the main antenna of a communications receiver. The sidelobe canceller system includes a conventional adaptive-loop canceller system adapted to receive the output(s) from either one or a plurality of directional auxiliary antennas. The directional auxiliary antennas have multiple, orthogonal, directional beams the sum of which covers 360° in azimuth and multiple output ports each corresponding to a different one of the orthogonal beams. Each output port of each antenna has a time delay connected between it and the adaptive-loop canceller system. In addition, the main antenna has a time delay connected between it and the adaptive-loop canceller system. The time delays for the auxiliary antenna(s) output ports and the main antenna are set at time values which will allow the signals from the auxiliary antenna ports and from the main antenna to be received at the adaptive-loop canceller system at the same time. These time values compensate for differences in path length of the wave-front signals received by the main and auxiliary antennas, so that they may be received at the adaptive-loop canceller at the same time, They must be received at the same time in the adaptive-loop canceller system for autocorrelation and cancelling to take place.

The novel feature of the invention is the use of directional auxiliary antenna(s), time delays between the output ports of the directional auxiliary antenna(s) and the adaptive-loop canceller system, and a time delay between the main antenna and the adaptive-loop canceller system. These elements allow the sidelobe canceller system to have widely spaced main and auxiliary antennas (e.g., 150 meters) which permits better azimuth angle resolution of interference wavefronts and improved cancelling.

BRIEF DESCRIPTION OF THE DRAWINGS

FIG. 1 is a schematic view of a prior-art sidelobe canceller system for cancelling multiple interference signals from the sidelobes of a main antenna signal.

FIG. 2 is a schematic view of one embodiment of the sidelobe canceller system of the present invention which utilizes one directional auxiliary antenna.

DESCRIPTION OF THE PREFERRED EMBODIMENTS(S)

Figure 3:
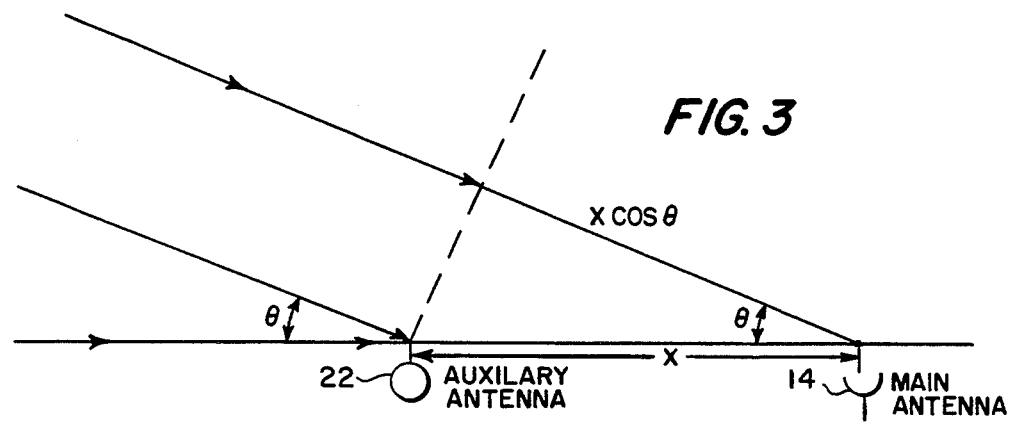
FIG. 3 is a diagrammatic representation of the geometric parameters utilized in determining the maximum spacing of the auxiliary antenna and main antenna in FIG. 2.

FIG. 1 is a schematic view of a conventional system for cancelling multiple interference signals from the sidelobes of a main antenna. Two omnidirectional auxiliary antennas 10, 12 are placed symmetrically about a main antenna 14, which is part of a communications receiver (not shown). The main antenna is highly directional and will receive a strong target signal in the main lobe due to the large gain of the main lobe. Strong interference signals will be received in the sidelobes. The omnidirectional antenna will receive only a small target signal (since the antenna has little gain) and a strong interference signal (since the interference source produces a strong signal). The two auxiliary antennas and the main antenna all feed into adaptive-loop canceller system 16. Wavefronts 18, 20 are incident on auxiliary antennas 10, 12 and main antenna 14, with the times of arrival of the wavefronts different for each antenna. The different arrival times can be looked at in terms of phase differences. The arrival time at the main antenna is the reference phase. For example, the vector diagram for auxiliary antenna 10 shows waveform 20 (designated by squares) leading in phase over the reference phase, since waveform 20 was received at auxiliary antenna 10 before it was received at main antenna 14. Similarly, wavefront 18 (designated by circles) lags the reference in phase. Looking at the vector diagram of phases for auxiliary antenna 12, the phases are reversed and waveform 18 leads in phase while waveform 20 lags in phase. Since the phase information is different for wavefronts 18, 20 at the auxiliary antennas 10 and 12, this information may be used in a conventional manner in adaptive-loop canceller system 16 to cancel the interference from both jammers. In summary, signals from two (or N) auxiliary antennas are used to cancel two (or N) jammers.

A constraint on this system is the fact that the signals from antennas 10, 12 and main antenna 14 must arrive at sidelobe canceller 16 at the same time for autocorrelation and cancelling to occur. More precisely, a 1 μsec pulse with a bandwidth of 1 MHz has a known autocorrelation time of 1 μsec. The time difference in arrival of the main and auxiliary antenna signals at adaptive-loop canceller 16 must be small, about 1/100 of the autocorrelation time of 1 μsec. Therefore, the signals from the main antenna and auxiliary antennas must arrive at adaptive-loop canceller 16 within 10 ηsec of each other. For this to happen, the auxiliary antennas must be electrically within 10 ηsec of the main antenna. This requires the auxiliary antennas to be placed within about 3 meters of the main antennas. A problem arises with the auxiliary antennas being this close to the main antenna. As a result of this close proximity, the phase differences between wavefronts 18, 20 received at the auxiliary antennas and main antenna will be very small and cancellation of interference in sidelobe canceller 16 will be lessened.

The present invention addresses the problem of closely spaced auxiliary and main antennas and solves the problem by allowing the main and auxiliary antennas to be separated by as much as 150 meters and still have the signals arrive simultaneously at adaptive-loop canceller system 16. FIG. 2 shows the geometric relationships which allow the greater separation of antennas. In general, if the angle of arrival of an interference wavefront is known and the distance between the main antenna and auxiliary antenna is known then the difference in arrival time of the wavefront at the main antenna and auxiliary antennas can be calculated by geometric relationships. Once the difference in arrival time is known, a time delay may be introduced into either the main antenna, a signal or auxiliary antenna signal so that they will reach the adaptive loop canceller at the same time for autocorrelation purposes. Prior art sidelobe canceller systems using omnidirectional antennas cannot determine the direction of arrival of interference signals and hence no increase in spacing between main and auxiliary antenna is possible.

Looking more closely at the geometric relationship of FIG. 2, main antenna 14 and a directional auxiliary antenna 22 are shown receiving an interference wavefront (dotted line) at an angle $\psi$. The interference wavefront is focused at the output port (due to the antenna's action, as will be explained later) in the five o'clock position in directional auxiliary antenna 22. The distance between main antenna 14 and auxiliary antenna 22 is shown as x. The wavefront reaches directional auxiliary antenna 22 first and must travel $x \cos\psi$ further to reach main antenna 14. This means a time difference in arrival of $$\frac{x \cos\psi}{c},$$

where c is the speed of light. To make the signals from main antenna 14 and from the five o'clock output port of directional auxiliary antenna 22 arrive at sidelobe canceller 16 at the same time (within the autocorrelation time), the signal from the five o'clock output port in directional auxiliary antenna 22 must be delayed by $$\frac{x \cos\psi}{c}.$$

This is accomplished by introducing a time delay 24 having a delay of $$\frac{x}{c} + \frac{x \cos\psi}{c}$$

between the five o'clock output port and adaptive loop canceller system 16. The additional x/c delay is added since the signal from main antenna 14 will be delayed x/c by time delay 30 for reasons to be explained subsequently. It can be seen from the above analysis that, if it is desired to increase the distance x between the main antenna 14 and auxiliary antenna 22, the delay of time delay 24 may be increased and the main antenna and auxiliary antenna signals will still reach adaptive-loop canceller system 16 at the same time.

Adaptive-loop canceller system 16 is shown as a series of conventional adaptive-loop cancellers. Each canceller will independently cancel interference received from a different one of the auxiliary antenna output ports in a conventional manner.

Directional antenna 22 has output ports spaced at angular intervals around its periphery. A wavefront entering one side of the antenna will be focused on the output port at the opposite side of the antenna. The angular spacing of the output ports will be the angular resolution of the auxiliary antenna. Each of the output ports will have a different delay line between it and adaptive-loop canceller system 16. For example, a wavefront coming from the right would leave through the output port in the 9 o'clock position and would have a time delay 26 with a delay of 0. A wavefront from the left would leave the output port in the three o'clock position and have a time delay 28 with a delay of $$\frac{2x}{c}.$$

Returning to the reason for the x/c delay in the main antenna signal, interference wavefronts may come in at any angle and may reach the main antenna before reaching the auxiliary antenna. This requires the main antenna signal to be delayed. The maximum delay that is needed is x/c which would be for a wavefront coming in from the right. Since the delay for the main antenna signal must be appropriate for a wavefront from any angle the delay is fixed at x/c and the delays for signals from all the output ports of auxiliary antenna 22 are delayed accordingly.

It has been shown that the distance between the main antenna 14 and auxiliary antenna 22 may be increased. However, a factor which limits the allowable separation between the main antenna 14 and directional auxiliary antenna 22 is the resolution of directional auxiliary antenna 22 (i.e., $\theta$, the angular distance between output ports). The reason for the limits on antenna separation is shown geometrically in FIG. 3. Main antenna 14 and auxiliary antenna 22 are a distance x apart. Interference waveforms are shown arriving at directional auxiliary antenna 22 directly from the left and at angle $\theta$, the extremes of resolution angle $\theta$. Since an interference waveform may arrive anywhere within the resolution limits of angle $\theta$, there is uncertainty in the angle of arrival. This uncertainty will be manifested as error in the time difference of the main antenna and auxiliary antenna signals reaching adaptive loop canceller 16. This error must be kept to less than 1/100 of the autocorrelation time (i.e., 10 ηsec) or correlation and cancelling will not take place.

Looking more closely at FIG. 3, if a wavefront comes in horizontally from the left, the path-length difference of the signal at auxiliary antenna 22 and at main antenna 14 is x. This is at one extreme for $\theta$. At the other extreme for $\theta$, a waveform coming in at an angle $\theta$ would have a path length difference of $x \cos\theta$. The path length difference for the wavefront coming directly from the right and for the wavefront coming in at angle $\theta$ is $x - x \cos\theta$. An unknown interference wavefront could be coming in anywhere in the angular region $\theta$; therefore its possible error can be defined as within $x - x \cos\theta$. The allowable error, or path-length difference, that is allowable for the autocorrelation time in adaptive-loop canceller 16 is about 10 n sec. This corresponds to about 3 meters, therefore, the path length difference for the two extremes of $\theta$ must be less than about 3 meters. An equation can be set up as follows:

$$x - x \cos\theta = 3 \text{ meters}$$

where $\theta$ is defined as $$\theta = \arcsin \frac{\lambda}{D}$$

where $\lambda$ is the operating wavelength

D is the diameter of the directional auxiliary antenna therefore:

$$x = \frac{3}{1 - \cos\theta} = 3/2 \sin 2^2\left(\frac{\theta}{2}\right) = \frac{3}{\frac{\lambda^2}{2D^2}} = \frac{6D^2}{\lambda^2}$$

for $$\frac{\lambda}{D} = .2$$

$$x = 150 \text{ meters}$$

This means that, for a resolution angle $\theta$ of about 12°, the maximum distance apart for the main and auxiliary antenna will be 150 meters. The spacing of the antennas is limited by the resolution of the antenna and the example of spacing of 150 yards is only an example. Spacing could be smaller or greater.

Figure 4:
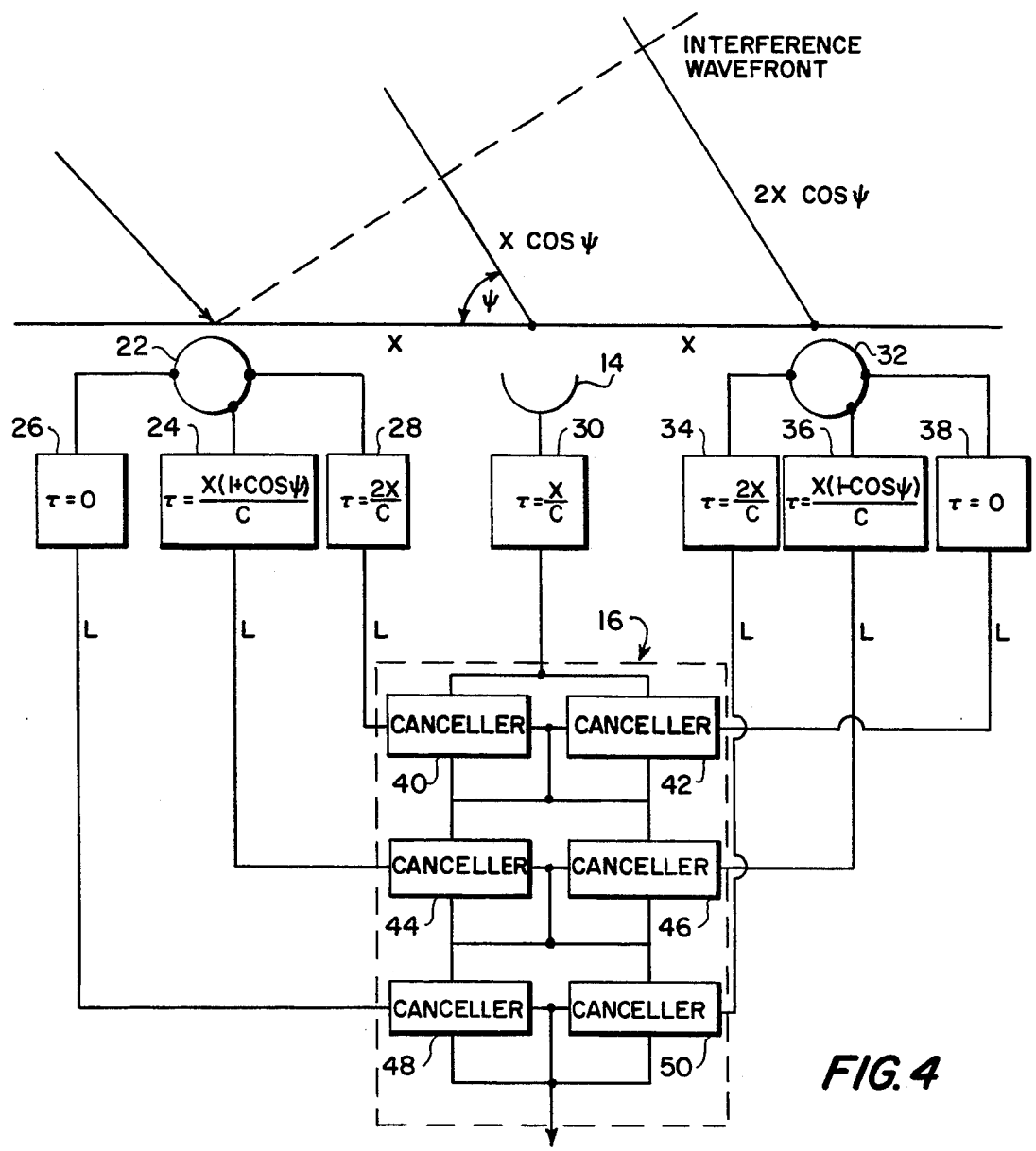
FIG. 4 is a schematic view of the system of FIG. 2 with the addition of an auxiliary antenna, which is the preferred embodiment of the invention.

The embodiment of FIG. 2 will cancel the interference of several interference wavefronts as long as the wavefronts arrive at angles sufficiently separated that they will not be present on the same output port of auxiliary antenna 22. However, if the wavefronts arrive within the resolution range of auxiliary antenna 22 they will be at the same output port and the interfering sources will not be separable; thus, adaptive-loop canceller system 16 will not be able to cancel the wavefronts from the main antenna signal. The solution to this problem is the sidelobe canceller system shown in FIG. 4 which is the preferred embodiment of the invention. FIG. 4 shows a canceller system identical to that of FIG. 2 with the addition of auxiliary antenna 32, similar to auxiliary antenna 22, accompanying time delays 34, 36, 38 having delays of $$\frac{2x}{c}, \frac{x(1 - \cos\psi)}{c},$$

and 0, respectively, and adaptive-loop canceller 16 having cancellers 40, 42, 44, 46, 48, 50. These cancellers make up parallel canceller sets of 40-42, 44-46, 48-50.

The parallel canceller sets are connected in series with each set connected to a different set of corresponding output ports of auxiliary antennas 22, 32. Each parallel canceller set will cancel the interference wavefront(s) coming in from the output ports of antennas 22, 32 to which they are attached. This will be done independently for each parallel canceller set. Parallel canceller sets such as those shown are among the earliest and simplest developed in the art. It is understood that any adaptive loop canceller system capable of handling one or more auxiliary antenna inputs may be used.

The sidelobe canceller system of FIG. 4 utilizes the same principles outlined in FIG. 1 for a canceller system using two auxiliary antennas. In the embodiment in FIG. 4 if two wavefronts are received within the angular resolution of auxiliary antennas 22, 32, the wavefronts will have different phases, with respect to main antenna 14, for both auxiliary antennas. This will allow cancellation to take place in a conventional manner in sidelobe cancel let 16. The fact that auxiliary antennas 22, 32 are separated from main antenna 14 by as much as 150 meters greatly increases the phase-shift differences between the wavefronts and enhances the ability of sidelobe canceller system 16 to exploit the larger phase-shift differences to cancel interference more effectively.

Figure 5:
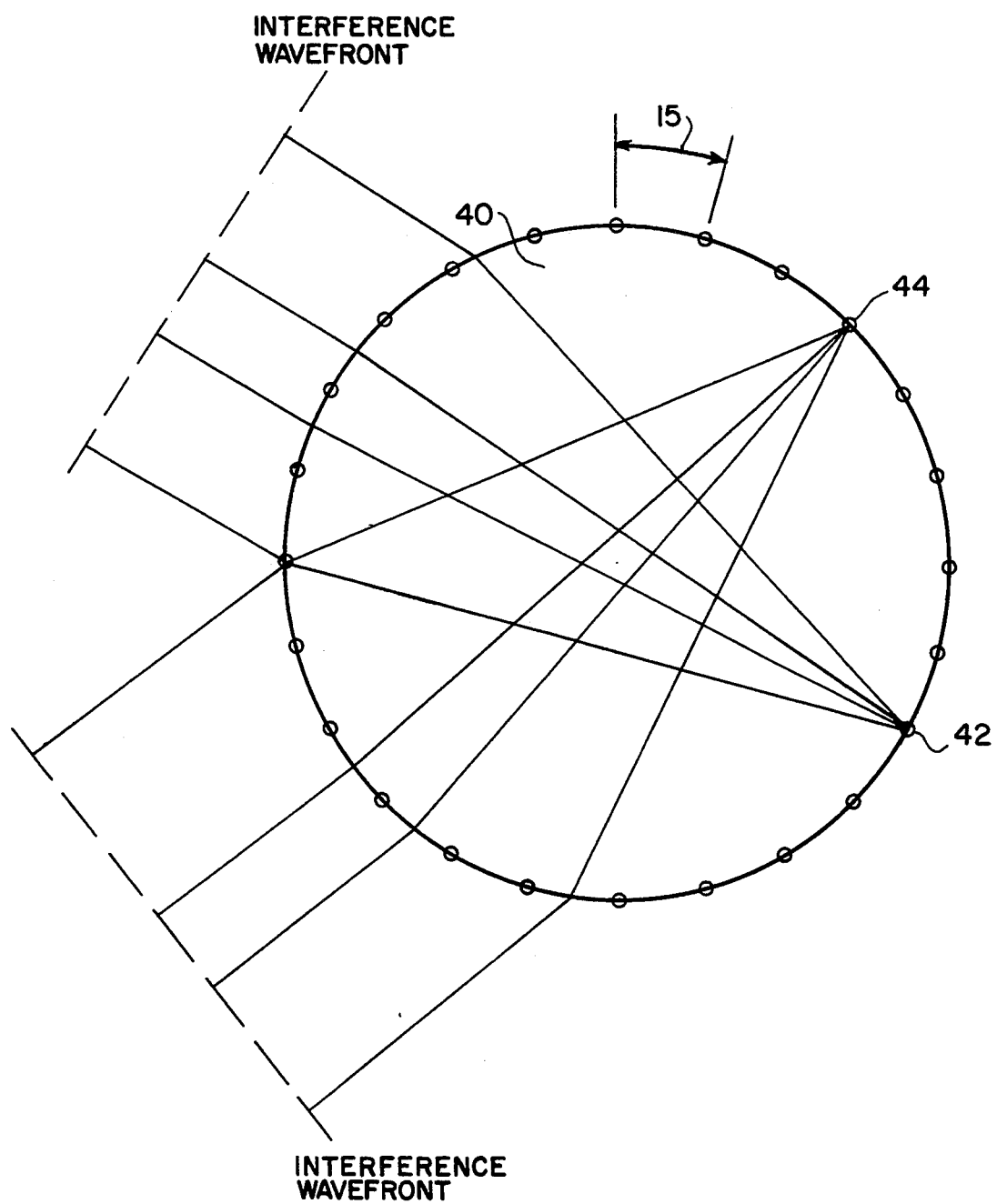
FIG. 5 is a schematic view of a conventional convex lens utilized for each of the auxiliary antennas of FIGS. 2, 4.

FIG. 5 shows a diagrammatic view of a conventional convex lens which may be used for auxiliary antennas 22, 32. Convex lenses are well known in the art for use as directional antennas. They are made of a round plate (or sphere) of dielectric material and have multiple orthogonal directional beams the sum of which covers 360° of azimuth. The lens will receive a wavefront from an azimuth angle and focus the received signal on an output port on the opposite side of the lens. The angular resolution $\theta$ of the lens is defined by the relation arcs in $\lambda/D$, where $\lambda$ is the operating wavelength and D is the diameter of the lens. Good design requires that each output port be separated by the amount of angular resolution $\theta$. In FIG. 5 there are 24 output ports therefore the resolution of the lens is 15°. A detailed theoretical examination of one type of convex lens is given in an article "Constant K Lenses," T. C. Cheston and E. J. Luoma, APL Technical Digest, March–April 1963, p 8. FIG. 5 shows an interference wavefront arriving at the convex lens at an angle from the upper left. The signal is focused by dielectric material 40 to output port 42. Similarly, an interference wavefront is arriving from the lower left and is focused on output 44. It should be appreciated that other types of directional antennas utilizing separate outputs for signals coming in at different angles could be used in place of a convex lens. For example, an antenna using a circular array of elements could be used.

In operation, a single interference wavefront may be cancelled by either the system of FIG. 2 or the preferred embodiment system of FIG. 4. The systems will operate similarly in cancelling a single interference wavefront; therefore, for simplicity, only the operation of the preferred embodiment of FIG. 4 will be described. In FIG. 4 the interference wavefront will be incident on auxiliary antennas 22, 32 and main antenna 14 at an angle $\psi$. The interference wavefront will reach auxiliary antenna 22 first, main antenna 14 at a time x cos$\psi$ later, and auxiliary antenna 32 at a time 2x cos$\psi$ later. The wave front entering auxiliary antenna 22 at angle $\psi$ will be focused in the antenna to the output port at the 5 o'clock position. The signal will then be delayed $$\frac{x(1 + \cos\psi)}{c}$$

in time delay 24 and will be fed to sidelobe canceller system 16. The interference wavefront will be received by main antenna 14 and fed to time delay 34 which delays the signal by x/c and directs the signal to sidelobe canceller 16 where it will arrive simultaneously (within the desired fraction of the autocorrelation time) with the signal from time delay 24. The interference wavefront will be received by auxiliary antenna 32 and will be focused by the antenna to the output port in the five o'clock position. The signal is directed through time delay 36, which is a $$\frac{x(1 - \cos\psi)}{c}$$

delay, to sidelobe canceller system 16 where it arrives simultaneously (within the desired fraction of the autocorrelation time) with its signals from time delay 30. The parallel canceller set including cancellers 44, 46 will autocorrelate the interference signal and cancel the interference signal from the sidelobes of main antenna 14.

Now consider the situation where an interference wavefront from a second jammer is incident upon auxiliary antennas 22, 32 and main antenna 14, directly from the left, at a zero angle of arrival. The interference wavefront will be fed from the output ports in the 3 o'clock position of auxiliary antennas 22, 32 will be delayed in time delays 28, 38, respectively, and will arrive at cancellers 40, 42 of sidelobe canceller system 16 simultaneously. The interference wavefront will also be received by main antenna 14, delayed by time delay 30 and forwarded to cancellers 40, 42 of sidelobe canceller 16 simultaneously with the signals from auxiliary antennas 22, 32. The interference waveforms at angle ψ and at zero angle are received by different parallel canceller sets, 44–46, and 40–42, respectively, which will cancel the two wavefronts independently. The system of FIG. 2 could similarly have cancelled the two wavefronts since they were at different output ports and cancelling is done independently.

The need to have a second auxiliary antenna (system of FIG. 4) occurs if two interference wavefronts arrive at an angle within the resolving power of the auxiliary lenses and the signals are felt at the same output port. For example, in FIG. 4 a waveform is shown coming in at angle ψ and being outputted from the output ports of auxiliary antennas 22, 32 at the 5 o'clock position. If another wavefront were felt at the output port in the 5 o'clock position for both auxiliary antennas 22, 32, the wavefronts would be mixed at the output ports and would be delayed and reach sidelobe canceller 44, 46 of canceller system 16 simultaneously. For cancellation to occur under these circumstances two auxiliary antennas are necessary since the interference signals are mixed. The phase-difference relationships outlined for FIG. 1 are necessary for cancellation of both interference signals. Since the antennas are of the order of 150 meters apart the phase differences are increased and cancellation of the both interference signals is improved.

The system described in FIG. 4 could easily be expanded into a system utilizing three or more auxiliary antennas and by adding more cancellers in a conventional manner to process three or more auxiliary antenna signal inputs.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the U.S. is:

1. In a communications receiver employing a directional main radar antenna and a sidelobe canceller system including an adaptive-loop canceller system for cancelling interference from the sidelobe signals of said main radar antenna, the improvement to said sidelobe canceller system which comprises:

directional auxiliary antenna means having multiple orthogonal directional beams the sum of which cover 360° in azimuth and multiple output ports each corresponding to a different one of said orthogonal directional beams, said directional auxiliary antenna means widely spaced from said main radar antenna for receiving interference signals and determining their angle of arrival;

a plurality of auxiliary-antenna time-delay means each connected to a different one of said output ports for providing differently delayed signals to said adaptive-loop canceller system with the amount of time delay proportional to the angular position of the output port to which the time delay means is connected to; and main-antenna time-delay means connected between said main radar antenna and said adaptive-loop canceller for providing a delayed signal to said adaptive-loop canceller system.

2. The system of claim 1 in which said directional auxiliary antenna means is a convex lens antenna.

3. The system of claim 1 in which said adaptive-loop canceller system has multiple cancellers for independently cancelling interference from the multiplicity of said output ports.

4. In a communications receiver employing a directional main radar antenna and a sidelobe canceller system including an adaptive-loop canceller system for cancelling interference from the sidelobe signals of said main radar antenna, the improvement to said sidelobe canceller system which comprises:

a plurality of directional auxiliary antenna means each having multiple orthogonal directional beams the sum of which is 360° in azimuth and multiple output ports each corresponding to a different one of said orthogonal directional beams, each said directional auxiliary antenna means widely spaced from said main radar antenna, for receiving multiple interference signals and determining their angle of arrival;

a plurality of auxiliary-antenna time-delays, each connected to a different one of said output ports for each said directional auxiliary antenna means, for providing differently delayed signals to said adaptive-loop canceller with the amount of time delay proportional to the angular position of the output port to which the time delay means is connected to; and a main antenna time delay means connected between said main radar antenna and said adaptive-loop canceller.

5. The system of claim 3 in which each said directional auxiliary antenna means is a convex lens antenna.

6. The system of claim 4 in which said adaptive-loop cancellet system has multiple cancellers for independently cancelling interference from the multiplicity of said output ports.

7. A communications receiver employing a directional main radar antenna and a sidelobe canceller system for cancelling interference from the sidelobe signals of said main radar antenna, the sidelobe canceller system comprising:

a plurality of directional auxiliary antenna means each having a multiple orthogonal directional beams the sum of which 360° in azimuth and multiple output ports each corresponding to a different one of said orthogonal directional beams, each said directional auxiliary antenna means widely spaced from said main radar antenna, for receiving multiple interference signals and determining their angle of arrival;

adaptive-loop canceller system means for cancelling multiple interference signals from the sidelobe signals of said main radar antenna;

a plurality of auxiliary antenna time-delay means each connected to a different one of said output ports for each said directional auxiliary antenna means, for providing differently delayed signals to said adaptive-loop canceller with the amount of time delay proportional to the angular position of the output port to which the time delay means is connected; and main-radar-antenna time-delay means connected between said main radar antenna and said adaptive-loop canceller for providing a delayed signal to said adaptive-loop canceller system.

8. The system of claim 7 in which each said directional auxiliary antenna means is a convex lens antenna.

9. The system of claim 7 in which said adaptive-loop canceller system has multiple cancellers for independently cancelling interference from the multiplicity of said output ports.

* * * * *